US006533231B1

(12) United States Patent
Kiviniitty

(10) Patent No.: US 6,533,231 B1
(45) Date of Patent: Mar. 18, 2003

(54) METHOD FOR MANUFACTURING A LIFTING HOOK AND A LIFTING HOOK

(75) Inventor: Ari Kiviniitty, Hämeenlinna (FI)

(73) Assignee: KCI Konecranes International PLC, Hyvinkaa (FI)

( * ) Notice: Subject to any disclaimer, the term of this patent is extended or adjusted under 35 U.S.C. 154(b) by 0 days.

(21) Appl. No.: 09/692,114

(22) Filed: Oct. 20, 2000

(30) Foreign Application Priority Data

Oct. 20, 1999 (FI) ........................................... 19992272

(51) Int. Cl.[7] ............................................. F16B 45/00

(52) U.S. Cl. ..................... 248/304; 248/339; 248/227.1

(58) Field of Search ................................ 248/304, 339, 248/229.14, 290.1, 294.1, 227.1

(56) References Cited

U.S. PATENT DOCUMENTS

| | | | | | |
|---|---|---|---|---|---|
| 1,576,197 | A | * | 3/1926 | Kuffel et al. | |
| 1,794,694 | A | * | 3/1931 | Jensen et al. | |
| 2,523,888 | A | * | 9/1950 | Veitch | 174/99 |
| 3,995,822 | A | | 12/1976 | Einhorn et al. | |
| 4,099,694 | A | * | 7/1978 | Horwitz | 248/339 |
| D249,327 | S | * | 9/1978 | Gaines | D8/367 |
| 4,174,087 | A | * | 11/1979 | Gaines | 248/339 |
| D259,700 | S | * | 6/1981 | Chasen | D8/367 |
| D265,379 | S | * | 7/1982 | Einhorn | D8/367 |
| 4,868,954 | A | * | 9/1989 | Kasai | 24/237 |
| 5,094,417 | A | * | 3/1992 | Creed | 248/215 |
| 5,566,428 | A | * | 10/1996 | Takahashi | 24/265 H |

FOREIGN PATENT DOCUMENTS

| | | |
|---|---|---|
| DE | 725114 | 9/1942 |
| DE | 3735021 | 5/1989 |
| FR | 1185962 | 8/1959 |
| FR | 2031700 | 11/1970 |

* cited by examiner

*Primary Examiner*—Anita King
*Assistant Examiner*—Steven Marsh
(74) *Attorney, Agent, or Firm*—Birch, Stewart, Kolasch & Birch, LLP

(57) ABSTRACT

A method for manufacturing a lifting hook and a lifting hook. In this method a supporting portion is formed of a lifting hook billet at the end of a lifting hook shaft, the lower surface of the supporting portion is formed into a bearing surface and correspondingly a separate uniform bearing ring surrounding the shaft is separated from the lifting hook billet, and a bearing surface is formed into the bearing ring. The lifting hook comprises a supporting portion at the end of the shaft and a uniform bearing ring surrounds the shaft between the hook and the supporting portion.

17 Claims, 2 Drawing Sheets

METHOD FOR MANUFACTURING A LIFTING HOOK AND A LIFTING HOOK

FIELD OF THE INVENTION

The invention relates to a method for manufacturing a lifting hook billet comprising a hook portion and a base portion.

The invention also relates to a lifting hook comprising a hook portion, a shaft integrated to the hook portion, a supporting portion at the end of the shaft substantially coaxial with the shaft, the diameter of the supporting portion exceeding the diameter of the shaft, and the supporting portion including a first bearing surface surrounding the shaft and facing the hook portion.

DESCRIPTION OF THE PRIOR ART

Lifting hooks are used in different hoisting apparatuses for supporting a load. In order to be able to turn a load as desired or to turn a hook to an appropriate position regarding the load, the hook is suspended from its upper end to a separate supporter rotatably around the vertical axis. At present the hook is frequently pivoted in order for the hook to rotate smoothly even when carrying a heavy load. Highly complicated constructions are presently used to mount the hook into a hole in the body rotatably in relation to the body. Both the hook and the body require a separate bearing surface supporting the load, which in today's heavy hoisting use is made of various separate bearing surfaces and fastening portions. Such surfaces are disclosed in publications DE 72 51 114 and DE 37 35 021, for example. U.S. Pat. No. 3,995,822 in turn discloses a solution in which the hook is at first fabricated so that a supporting flange is placed at the upper end of the hook, where after a supporting portion is cast around the hook between the flange and the hook portion around the axis of the hook. This structure is intended for solutions in which the hook carries a small load. Here it is not possible either to form proper bearing surfaces, since the cast portion cannot in practice be machined around the hook on location.

The problem with prior art solutions is that the constructions composed of different separate portions are expensive to manufacture. Possible mounting mistakes and the loading capacity of small components restrict the loading and may cause the construction to collapse. This, in turn, increases the accident risk.

BRIEF SUMMARY OF THE INVENTION

It is an object of the present invention to provide such a method for manufacturing a lifting hook and such a lifting hook that allow to avoid the problems of the prior art solutions and to provide a firm and durable hook construction. The method of the invention comprises the steps of forming a lifting hook shaft from the base portion of the lifting hook billet, forming a first bearing surface at the end of the lifting hook shaft, the first bearing surface faces the hook portion and is intended to support the lifting hook, and forming a uniform bearing ring around the lifting hook shaft, the bearing ring being arranged between the first bearing surface and the hook portion, by detaching it from the lifting hook billet. The lifting hook of the invention further comprises a uniform bearing ring surrounding the shaft, the bearing ring being arranged between the supporting portion and the hook portion, the bearing ring being made of a hook billet by detaching a ring-shaped portion that surrounds the hook shaft.

The basic idea with the invention is that the supporting portion at the end of the lifting hook as well as both the bearing surfaces of the lifting hook are formed of the same hook billet so that, on one hand the supporting portion at the upper end of the hook supporting the load and the bearing surface on the lower surface thereof are made of the same material as the rest of the hook, and on the other hand the lower bearing ring supporting the hook and the bearing surface on the upper surface thereof are machined of the same hook billet, in which case the required bearings can be placed between these two bearing surfaces. Thus a uniform solid bearing surface is simply and easily obtained at the upper end of the hook and beneath the hook. The structure is also very reliable and endures heavy loading. Another advantage is that the supporting body does not require a bearing surface, instead the bearing ring detached from the hook by machining is unrotatably supported by the body.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following the invention will be described in greater detail with reference to the accompanying drawings which are given by way of illustration only, and thus are not limitative of the present invention, and in which FIG. 1 schematically shows a hook billet, FIG. 2 schematically shows the partly machined hook billet, FIG. 3 schematically shows a completed lifting hook, and FIG. 4 schematically shows the lifting hook in use.

DETAILED DESCRIPTION OF THE INVENTION

Figure 1:
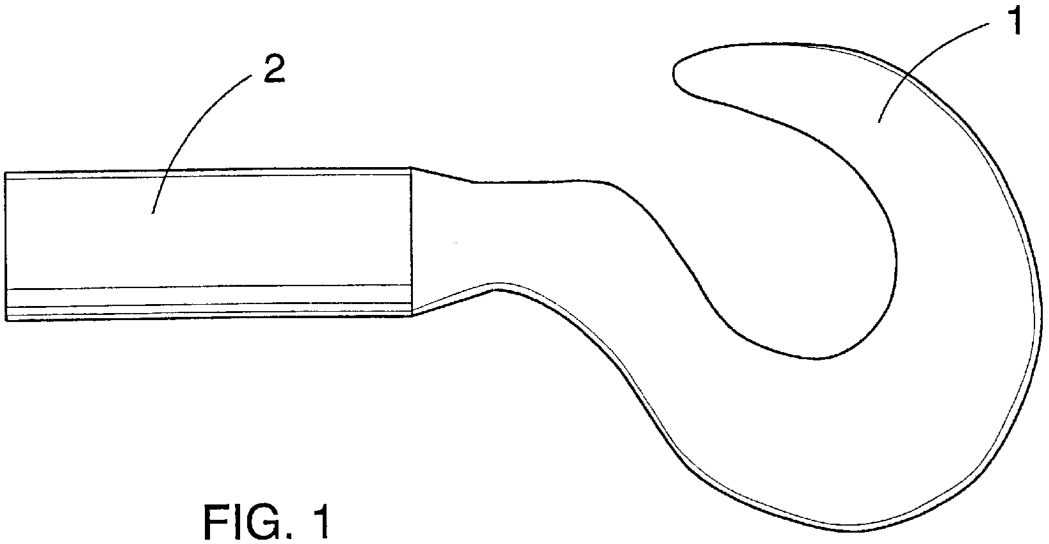

FIG. 1 schematically shows a hook billet fabricated either by casting or by forging. The hook billet comprises an actual hook portion 1 and a base portion 2. The actual hook is fabricated by machining the hook billet.

Figure 2:
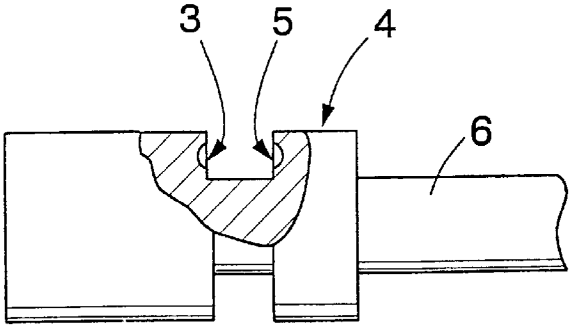

FIG. 2 schematically shows the partly machined and partly cut base portion of the hook billet according to FIG. 1. As FIG. 2 shows, an upper bearing surface 3, i.e. a first bearing surface 3, for supporting the hook and correspondingly a bearing surface 5, i.e. a second bearing surface 5, of a lower bearing ring 4 are formed to the hook billet, for example, by turning. The Figure also shows how the second edge of the lower bearing ring is machined so as to form the lower surface thereof and at the same time a portion of the lifting hook shaft 6. The Figure shows that a part at the end of the lifting hook shaft 6, or the part on the left of the Figure, still remains unmachined, and the bearing ring 4 is still attached to the lifting hook shaft 6. At this stage all these parts are made of the same material, from which a separate bearing ring 4 and correspondingly the supporting portion of the lifting hook end are fabricated.

Figure 3:
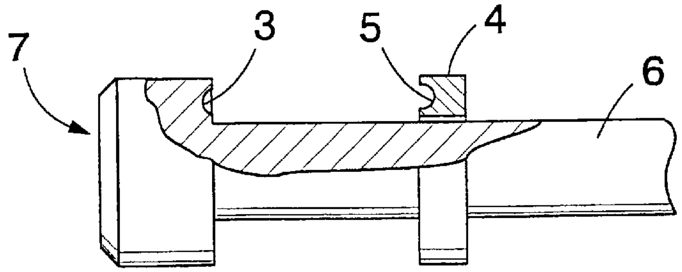
Figure 4:
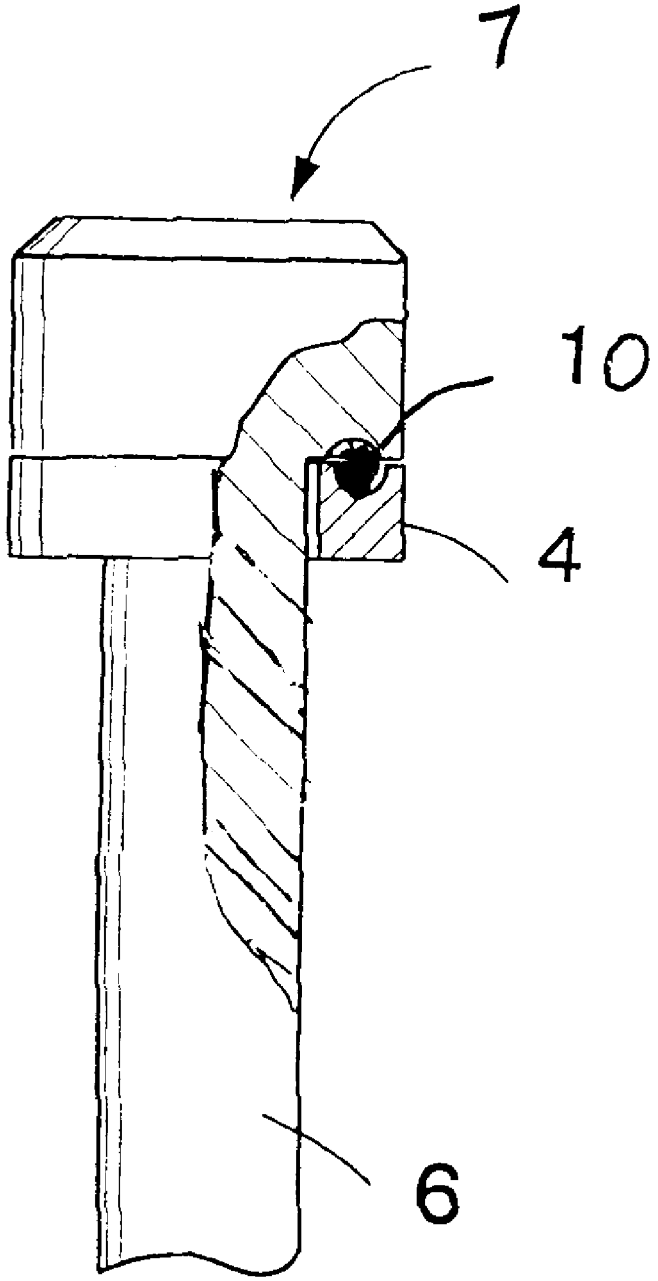

FIG. 3 is a partly cut view showing the end of a completed lifting hook. As the Figure shows the lower bearing ring 4 is separated from the lifting hook billet by removing material from the space between the bearing ring and the lifting hook shaft 6, for example by turning or by using another type of machining. In this way a separate ring-shaped part functioning as a bearing ring is formed around the lifting hook shaft 6. Correspondingly, the shaft 6 uniformly continues to the end of the lifting hook, where a supporting portion 7 comprising the upper bearing surface 3 is made of the same material as the lifting hook shaft 6. Thus, a separate uniform bearing ring 4 is formed between the supporting part 7 at the end of the lifting hook and the actual hook portion 1. Therefore when the lifting hook is mounted in position, bearing balls 10 can be placed between the bearing surfaces 5 and 3, as shown in FIG. 4, where after the hook can be placed to rest on the supporting body by means of the lower bearing ring 4.

The invention is explained above by way of example only, but it is not restricted thereto. The different stages of the fabrication method can be performed in various ways and in a different order, as long as a supporting portion made of the same material as the lifting hook and comprising a bearing surface is formed at the end of the lifting hook billet. The lifting hook is able to rotate by means of such a supporting portion. Correspondingly a separate bearing ring is formed around the lifting hook shaft 6. The bearing ring comprises a second bearing surface facing the bearing surface connected to the lifting hook shaft so that the lifting hook can rotate by means of said bearing ring. Furthermore, various machining methods can be used for manufacturing lifting hooks, such as turning, arc machining, sawing, milling etc. as long as the end result is a construction comprising at the end of the lifting hook shaft a supporting portion which is made of the same uniform material as the lifting hook shaft, and in addition the shaft is surrounded by a separate uniform bearing ring forming together with the supporting portion at the end of the shaft a bearing pair so that the lifting hook may smoothly rotate around the bearing ring when mounted to the support thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A lifting hook comprising a hook portion, a shaft integrated to the hook portion, a supporting portion at the end of the shaft substantially coaxial with the shaft, the diameter of the supporting portion exceeding the diameter of the shaft, and the supporting portion including a first bearing surface surrounding the shaft and facing the hook portion, and a uniform bearing ring surrounding the shaft, the bearing ring being arranged between the supporting portion and the hook portion, a diameter of the bearing ring being the same or less than a diameter of the supporting portion, the bearing ring being made of a hook billet by detaching a ring-shaped portion that surrounds the hook shaft, whereby said hook portion, said shaft, said supporting portion and said bearing ring being initially formed as a one-piece unitary member.

2. The lifting hook as claimed in claim 1, wherein the bearing ring comprises a second bearing surface facing the supporting portion at the end of the hook shaft so that bearing balls can be placed between the bearing surface of the bearing ring and the bearing surface of the supporting portion.

3. The lifting hook as claimed in claim 1, wherein the bearing ring is rotatable relative to the shaft.

4. The lifting hook as claimed in claim 1, wherein the bearing ring is rotatable relative to the supporting portion.

5. The lifting hook as claimed in claim 1, wherein the first bearing surface has a recess and the bearing ring has a second bearing surface with a recess and further comprising bearing balls which are simultaneously received in the recesses of the first and second bearing surfaces.

6. The lifting hook as claimed in claim 1, wherein the shaft, the supporting portion and the bearing ring are all made from the same material.

7. The lifting hook as claimed in claim 1, wherein all of the bearing ring is positioned between the supporting portion and the hook portion.

8. The lifting hook as claimed in claim 7, wherein the bearing ring is rotatable relative to the shaft.

9. A lifting hook comprising a hook portion, a shaft integrated to the hook portion, a supporting portion at the end of the shaft substantially coaxial with the shaft, the diameter of the supporting portion exceeding the diameter of the shaft, and the supporting portion including a first bearing surface surrounding the shaft and facing the hook portion, and a uniform bearing ring surrounding the shaft, the bearing ring being arranged between the supporting portion and the hook portion, the bearing ring being made of a hook billet by detaching a ring-shaped portion that surrounds the hook shaft, whereby said hook portion, said shaft, said supporting portion and said bearing ring being initially formed as a one-piece unitary member.

10. The lifting hook as claimed in claim 9, wherein the bearing ring comprises a second bearing surface facing the supporting portion at the end of the hook shaft so that bearing balls can be placed between the bearing surface of the bearing ring and the bearing surface of the supporting portion.

11. The lifting hook as claimed in claim 9, wherein the bearing ring is rotatable relative to the shaft.

12. The lifting hook as claimed in claim 9, wherein the bearing ring is rotatable relative to the supporting portion.

13. The lifting hook as claimed in claim 12, wherein a diameter of the bearing ring is the same or less than the diameter of the supporting portion.

14. The lifting hook as claimed in claim 9, wherein the first bearing surface has a recess and the bearing ring has a second bearing surface with a recess and further comprising bearing balls which are simultaneously received in the recesses of the first and second bearing surfaces.

15. The lifting hook as claimed in claim 9, wherein the shaft, the supporting portion and the bearing ring are all made from the same material.

16. The lifting hook as claimed in claim 9, wherein all of the bearing ring is positioned between the supporting portion and the hook portion.

17. The lifting hook as claimed in claim 16, wherein the bearing ring is rotatable relative to the shaft.

* * * * *